United States Patent
Kumar et al.

(10) Patent No.: US 11,543,882 B1
(45) Date of Patent: Jan. 3, 2023

(54) SYSTEM AND METHOD FOR MODULATING USER INPUT IMAGE COMMANDS AND/OR POSITIONS ON A GRAPHICAL USER INTERFACE (GUI) BASED ON A USER GUI VIEWING DIRECTION AND/OR FOR SIMULTANEOUSLY DISPLAYING MULTIPLE GUIS VIA THE SAME DISPLAY

(71) Applicant: APP-POP-UP INC., Winnipeg (CA)

(72) Inventors: Rajeev Kumar, Disraeli (CA); Rakesh Kumar, Disraeli (CA)

(73) Assignee: APP-POP-UP INC., Manitoba (CA)

( * ) Notice: Subject to any disclaimer, the term of this patent is extended or adjusted under 35 U.S.C. 154(b) by 0 days.

(21) Appl. No.: 17/443,563

(22) Filed: Jul. 27, 2021

(51) Int. Cl.
*G06F 3/01* (2006.01)
*G06F 3/14* (2006.01)
*G06F 3/04886* (2022.01)
*G06F 3/16* (2006.01)

(52) U.S. Cl.
CPC .......... *G06F 3/013* (2013.01); *G06F 3/04886* (2013.01); *G06F 3/14* (2013.01); *G06F 3/167* (2013.01); *G06F 2203/04803* (2013.01)

(58) Field of Classification Search
CPC ........ G06F 3/013; G06F 3/14; G06F 3/04845; G06F 3/04886; G06F 3/165; G06F 3/167; G06F 2203/04803; G06F 9/451; G06Q 30/0277
See application file for complete search history.

(56) References Cited

U.S. PATENT DOCUMENTS

| | | | | |
|---|---|---|---|---|
| 9,977,800 | B2 * | 5/2018 | Shriber | G06F 16/24578 |
| 10,198,155 | B2 * | 2/2019 | Maheshwari | G06F 3/0484 |
| 10,305,758 | B1 * | 5/2019 | Bhide | G06F 11/3466 |
| 11,044,179 | B1 * | 6/2021 | Bettaiah | G06F 11/3419 |
| 11,144,545 | B1 * | 10/2021 | Tankersley | G06F 11/323 |

* cited by examiner

*Primary Examiner* — Vijay Shankar
(74) *Attorney, Agent, or Firm* — Praxis

(57) ABSTRACT

A system for modulating user commands via command input images displayed on a graphical user interface based on a user viewing direction relative to the displayed command input images and the graphical user interface. An image capturing device captures real time images of a user's face, eyes and irises and determines the eye orientation. The graphical user interface is separated into interface portions and the system determines if any of the foregoing are viewed portions. The system determines whether a viewed portion contains a command input image and only allows user input commands via the command input image to be processed if the image is within a viewed portion. The system can modulate a position of a command input image displayed on a graphical user interface based on a user viewing direction relative to graphical user interface thereby moving an input image on the graphical user interface.

17 Claims, 7 Drawing Sheets

SYSTEM AND METHOD FOR MODULATING USER INPUT IMAGE COMMANDS AND/OR POSITIONS ON A GRAPHICAL USER INTERFACE (GUI) BASED ON A USER GUI VIEWING DIRECTION AND/OR FOR SIMULTANEOUSLY DISPLAYING MULTIPLE GUIS VIA THE SAME DISPLAY

CROSS-REFERENCE TO RELATED APPLICATIONS

N/A

TECHNICAL FIELD

The present disclosure generally relates to computer graphical user interfaces including touch-displays. More particularly, but not exclusively, the present disclosure relates to a system and method for modulating user input image commands and/or positions on a graphical user interface (GUI) based on a user GUI viewing direction and/or for simultaneously displaying multiple GUIs via the same display.

BACKGROUND

Computer graphical user interfaces using touch touch-displays are widely used on a daily basis on mobile units, tablets, laptops, PCs and other computers for a variety of purposes including streaming material for entertainment, educational or business purposes such as transactions including purchasing. Touch display screens can be capacitive or resistive. Resistive screens rely on applied pressure which means that sometimes the tip of a pen or another object can initiate a response from the system. Capacitive touch screens use electrical conductors rather than pressure to recognize a command and respond. Capacitive touch screens depend on a specific amount of electrical charge to get a response from the operating system. This electrical charge can be provided by the user's bare fingers or special styluses, gloves, and the like.

Although widely convenient, touch screens sometimes pose user interaction challenges, as more often than not the screen is "busy" with command input images such as icons and windows and the user often touches an undesired screen portion leading them to a an undesired window and consequently, the user needs to return to the original page and proceed again.

Command input images are usually in the same position on the graphical user interface.

Merchants provide users with graphical user interfaces to view article or service information and to proceed to purchase. The merchant-provided user interfaces as usually "busy" with clickable material and adds as merchants are always trying to capture the attention of potential customers streaming in an online marketplace. One of the challenges merchants have is incentivizing users to view advertising material during live streams (such as sports, concerts and other events).

OBJECTS

An object of the present disclosure is to provide a computer-implemented system for modulating user commands via command input images displayed on a graphical user interface based on a user viewing direction relative to the displayed command input images and the graphical user interface.

An object of the present disclosure is to provide a method for modulating user commands via command input images displayed on a graphical user interface based on a user viewing direction relative to the displayed command input images and the graphical user interface.

An object of the present disclosure is to provide a computer-implemented system for modulating a position of a command input image displayed on a graphical user interface and movable thereon based on a user viewing direction relative to graphical user interface.

An object of the present disclosure is to provide a method for modulating a position of a command input image displayed on a graphical user interface and movable thereon based on a user viewing direction relative to graphical user interface.

An object of the present disclosure is to provide a system for simultaneously displaying multiple graphical user interfaces via the same display, wherein the multiple graphical user interfaces are hosted by one or more remote host controllers.

An object of the present disclosure is to provide a method for simultaneously displaying multiple graphical user interfaces via the same display, wherein the multiple graphical user interfaces are hosted by one or more remote host controller.

SUMMARY

In accordance with an aspect of the present disclosure, there is provided a computer-implemented system for modulating user commands via command input images displayed on a graphical user interface based on a user viewing direction relative to the displayed command input images and the graphical user interface, the system comprising: an image capturing device for capturing real time images of the user's face, eyes and irises; a controller in operative communication with the graphical user interface and with the image capturing device, the controller having a processor with an associated memory of processor executable code that when executed provides the controller with performing computer-implementable steps comprising: determining a respective position for each of the command input images displayed on the graphical user interface; receiving real time captured images of the face, eyes and irises of the user from the image capturing device; separating the graphical user interface into interface portions thereof; determining in real time a general eye orientation of the user based on the real time captured images; determining a real-time correlation between the determined general eye orientation and one or more of the interface portions thereby determining a viewing direction of the user and one or more real-time viewed interface portions; and determining in real-time if the one or more viewed interface portions contain one or more of the command input images; wherein when the user inputs a user command via a selected one of the command input images, the execution of the processor executable code provides the controller with performing computer-implementable steps comprising: determining in real time if the selected command input image is positioned within the one or more viewed interface portions or if the selected command input image is not positioned within the one or more viewed interface portions; allowing the user command to be processed if the selected command input image is positioned within the one or more viewed interface portions; and preventing the user command to be processed if the selected command input image is not positioned within the one or more viewed interface portions.

In accordance with an aspect of the present disclosure, there is provided a method for modulating user commands via command input images displayed on a graphical user interface based on a user viewing direction relative to the displayed command input images and the graphical user interface, the method comprising: capturing real time images of the user's face, eyes and irises; determining a respective position for each of the command input images displayed on the graphical user interface; separating the graphical user interface into interface portions thereof; determining in real time a general eye orientation of the user based on the real time captured images; determining a real-time correlation between the determined general eye orientation and one or more of the interface portions thereby determining a viewing direction of the user and one or more real-time viewed interface portions; determining in real-time if the one or more viewed interface portions contain one or more of the input images; providing for the user to input a user command via a selected one of the command input images; determining in real time if the selected command input image is positioned within the one or more viewed interface portions or if the selected command input image is not positioned within the one or more viewed interface portions; allowing the user command to be processed if the selected command input image is positioned within the one or more viewed interface portions; and preventing the user command to be processed if the selected command input image is not positioned within the one or more viewed interface portions.

In an embodiment, the user inputs the user command via the selected one of the command input images by a touch command. In an embodiment, the user inputs the user command via the selected one of the command input images by a click command.

In an embodiment, the system further comprises a voice input device in operative communication with the controller, wherein user inputs the user command via the selected one of the command input images by a voice command via the voice input device. In an embodiment, the memory contains a database of registered voice commands, each of the registered voice commands being associated with a respective one of the command input images, wherein execution of the processor executable code provides the controller with performing computer-implementable steps comprising: receiving the voice command via the voice input device; comparing the voice command with the registered voice commands; determining a match between the voice command and the registered voice command, wherein the match is indicative of the selected one of the command input images.

In accordance with an aspect of the present disclosure, there is provided a computer-implemented system for modulating a position of a command input image displayed on a graphical user interface and movable thereon based on a user viewing direction relative to graphical user interface, the system comprising: an image capturing device for capturing real time images of the user's face, eyes and irises; a controller in operative communication with the graphical user interface and with the image capturing device, the controller having a processor with an associated memory of processor executable code that when executed provides the controller with performing computer-implementable steps comprising: determining a first position of the movable command input image displayed on the graphical user interface; receiving real time captured images of the face, eyes and irises of the user from the image capturing device; separating the graphical user interface into interface portions thereof; determining in real time a general eye orientation of the user based on the real time captured images; determining a real-time correlation between the determined general eye orientation and one or more of the interface portions thereby determining a viewing direction of the user and one or more real-time viewed interface portions; and moving the movable command input image from the first position to a second position on the graphical user interface, wherein the second position is at the one or more real-time viewed interface portions.

In accordance with an aspect of the present disclosure, there is provided a method for modulating a position of a command input image displayed on a graphical user interface and movable thereon based on a user viewing direction relative to graphical user interface, the method comprising: capturing real time images of the user's face, eyes and irises; determining a first position of the movable command input image displayed on the graphical user interface; separating the graphical user interface into interface portions thereof; determining in real time a general eye orientation of the user based on the real time captured images; determining a real-time correlation between the determined general eye orientation and one or more of the interface portions thereby determining a viewing direction of the user and one or more real-time viewed interface portions; and moving the movable command input image from the first position to a second position on the graphical user interface, wherein the second position is at the one or more real-time viewed interface portions In an embodiment, the movable command input image provides for inputting one or more user commands.

In an embodiment, the movable command input image is selectively rendered non-visible on the graphical user interface although present by a user input command.

In an embodiment, the movable command input image is selectively activated by a user input command to be movable and selectively deactivated by a user input command to immovable.

In an embodiment, the user input command for activating the movable command input image is selected from the group consisting of a touch screen command, a voice command, a click command, a console command, a keyboard command, and any combination thereof. In an embodiment, the user input command for deactivating the movable command input image is selected from the group consisting of a touch screen command, a voice command, a click command, a console command, a keyboard command, and any combination thereof.

In an embodiment, the user input command for activating the movable command input image comprises a user viewing direction command, wherein the execution of the processor executable code provides the controller with performing computer-implementable steps comprising: determining the interface portion in which the command input image is at the initial position thereby determining an initial interface portion; determining in real time a general eye orientation of the user based on the real time captured images; determining a real-time correlation between the determined general eye orientation and the initial interface portion thereby determining if the viewing direction of the user is directed to the initial interface portion; and activating the input command image based on a predetermined time frame stored in the memory during which the the user viewing direction is directed to the initial interface portion.

In accordance with an aspect of the disclosure, there is provided a system for simultaneously displaying multiple graphical user interfaces via the same display, wherein the multiple graphical user interfaces are hosted by one or more remote host controllers, the system comprising: a user device in operative communication with the one or more remote host controllers and comprising an interface display for displaying one or more of the multiple graphical user interfaces; a system controller in operative communication with the user display device, the system controller having a processor with an associated memory of processor executable code that when executed provides the controller with performing computer-implementable steps comprising: separating the interface display in two or more interface display portions; and selectively providing for two or more of the graphical user interfaces to be simultaneously displayed via respective ones of the two or more interface display portions.

In accordance with an aspect of the present disclosure, there is provided a method for simultaneously displaying multiple graphical user interfaces via the same display, wherein the multiple graphical user interfaces are hosted by one or more remote host controllers, the system comprising: providing interface display for displaying one or more of the multiple graphical user interfaces; separating the interface display in two or more interface display portions; and selectively providing for two or more of the graphical user interfaces to be simultaneously displayed via respective ones of the two or more interface display portions.

In an embodiment, an input command image is selected from the group consisting of and without limitation, an image, an icon, a window, a virtual keyboard, a word, a sign, a virtual console, a cursor, combinations thereof and the like for inputting one or more commands via touch, clicks, Other objects, advantages and features of the present disclosure will become more apparent upon reading of the following non-restrictive description of illustrative embodiments thereof, given by way of example only with reference to the accompanying drawings.

DETAILED DESCRIPTION OF ILLUSTRATIVE EMBODIMENTS

Generally stated and in accordance with an aspect of the present disclosure, there is provided a computer-implemented system for modulating user commands via command input images displayed on a graphical user interface based on user eye viewing direction relative to the displayed command input images and the graphical user interface. The system comprises an image capturing device in operative communication with a controller. The image capturing device provides for capturing real time images of the user's face, eyes and irises. The controller is in operative communication with the user interface.

The controller has a processor with an associated memory of processor executable code that when executed provides the controller with performing computer-implementable steps. A respective position for each of the command input images displayed on the graphical user interface is determined. The controller receives real time captured images of the face, eyes and irises of the user from the image capturing device. The graphical user interface is separated into interface portions thereof. The general eye orientation of the user is determined in real time based on the real time captured images. A correlation between the determined general eye orientation and one or more of the interface portions is determined in real time thereby determining a viewing direction of the user and one or more real-time viewed interface portions. The controller determines in real time if the one or more viewed interface portions contain one or more of the command input images.

When the user inputs a user command via a selected one of the command input images, the controller provides for determining in real time if the selected command input image is positioned within the one or more viewed interface portions or if the selected command input image is not positioned within the one or more viewed interface portions. If the selected command input image is positioned within the one or more viewed interface portions, the controller allows the user command to be processed. If the selected command input image is not positioned within the one or more viewed interface positions, the controller prevents the user command from being processed.

Figure 1:
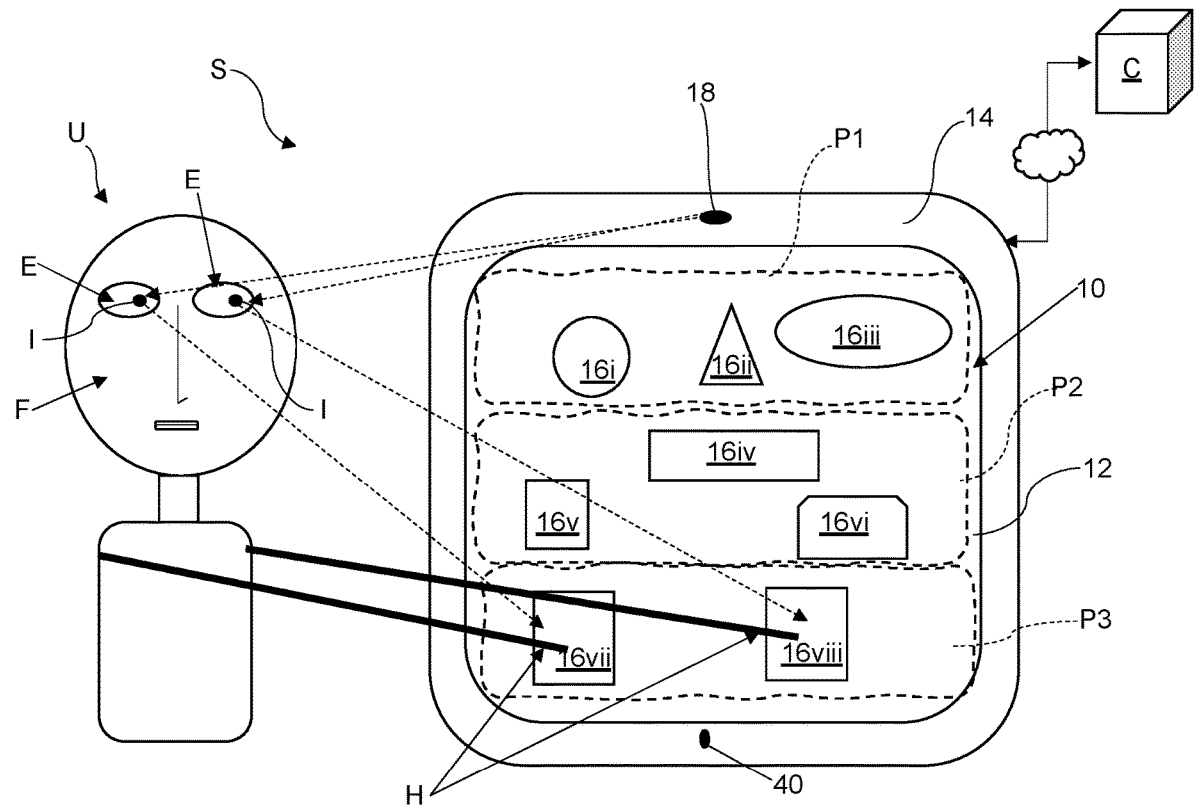
FIG. 1 is a schematic representation of an system for modulating user input image commands displayed on a graphical user interface (GUI) based on a user GUI viewing direction in accordance with a non-restrictive illustrative embodiment of the present disclosure, a computer device displaying an interface with touch command input images to be viewed and touched by a user.

Turning to FIG. 1, there is shown a schematic representation of the general operation of the system S and method provided herein. The system S and method provide for a user U to access a graphical user interface 10 via the display screen 12 on their computer device 14 (such as a tablet, PC, lap-top and the like). The interface 10 includes a plurality of touch-display input images 16*i*, 16*ii*, 16*iv*, 16*v*, 16*vi*, 16*vii*, 16*viii* which provide for the user to input commands via touch as is known in the art. The computer device 14 includes an image capturing device such as camera 18 which captures images of the face F of the user, their eyes E and the iris I of each eye E as well as their hands H. The camera 18 captures the position of each iris so that the system S can determine the direction of the user's field of vision (FOV) and more particularly to determine the general fovea field direction. In this way, the system S and method herein provide for determining which portion P1, P2, P3 of the interface 10, the user is looking at. The portions P1, P2, P3 contain respective touch-display input images. For example, portion P1 contains images 16*i*, 16*ii* and 16*iii*; portion P2 contains images 16*iv*, 16*v*, and 16*vi*; and portion P3 contains images 16*vii* and 16*viii*.

The system includes a controller C with an associated memory of processor executable code that when executed provide the controller for performing computer-implementable steps provided herein. The controller C is in operative communication with the interface 10 and the camera 18.

The camera 18 allows for the controller to determine a distance between the user's eyes F and the display screen 12.

The user's face F is not fixed but constantly moving and as such, the camera 18 is receiving a real time position of the Face F, eyes E and Iris I and thus with this information, along with the distance provide the controller C to determine a general fovea direction which corresponds to a general portion P1, P2 or P3.

For the user U to activate a given touch-display input image such as 16*vii* and 16*viii*, they must touch the image (16*vii* and 16*viii*) with their fingers (or by another type of touch command as is known in the art) directly on the display screen 12 and this command is detected in real time by the system S and method herein. In addition to this touch command, the method and system simultaneously and in real time verifies (by way of the computer-implementable steps) if the user U is looking at the touched images 16*vii* and 16*viii* by verifying if the general fovea field direction of the user is towards a portion of the display screen that the touched image or images are located in. In this example, the touched images 16*vii* and 16*viii* are located in portion P3 and as such, when the user U touches images 16*vii* and 16*viii* the system S and method verifies if the user U is looking at portion P3 and if so, the system S and method allows the activation of the images 16*vii* and 16*viii*, wherein activation is the processing of the input command. Alternatively, if the user U touches images 16*vii* or 16*viii* but is not looking at portion P3, the system S and method does not allow the input command to be processed.

Figure 2:
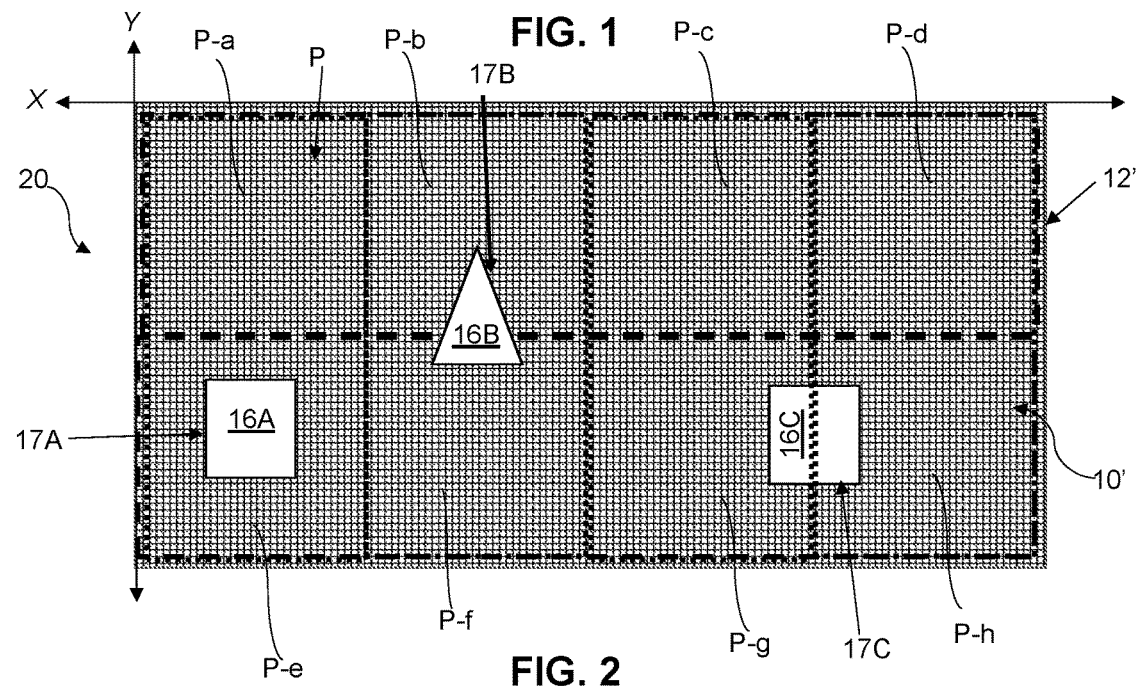
FIG. 2 is a schematic representation of computer generated cartesian table of a displayed GUI of the present system with command input images positioned at one or more computer-generated portions of the GUI in accordance with a non-restrictive illustrative embodiment of the present disclosure.

Turning now to FIG. 2, the system S and method herein provide by way of the computer-implemented steps for generating a cartesian table 20 of a display screen 12' for displaying a graphical user interface 10'. The cartesian table 20 includes a vertical Y axis and a horizontal X axis defining a plurality of given coordinates $(X_n, Y_n)$ for each given pixel P. Accordingly, touch-display input images 16A, 16B, and 16C are positioned within specific pixel zones 17A, 17B and 17C covering a plurality of pixels P, each with a respective coordinate (detected by the system and method). As such, the position of each image such as 16A, 16B and 16C on the screen 12' is determined by the system and method herein. Thus, the controller provides for separating a graphical user interface into interface portions thereof.

Given the fact, that it would be excessively difficult to determine with a high level of precision if the general fovea field direction of the user U is oriented towards a given pixel zone 17A, 17B, and 17C the system and method separates the cartesian table in portions P-a, P-b, P-c, P-d, P-e, P-f, P-g, P-h, and determines if the general fovea field direction of the user U is directed to one or more of the foregoing portions. A given portion P-a contains pixels P within coordinates $(X_a, Y_a)$ to $(X_{a'}, Y_{a'})$. As such, the system and method by way of the computer implementable steps determine which display screen portions (P-a to P-h) if any of the touch screen display images 16A, 16B, and 16C are in. In this example, image 16A is in portion P-e, image 16B is in portions P-b and P-f and image 16C is in portions P-g and P-h.

As such, if a user touches image 16A, the system S verifies by way of the computer-implementable steps performed by the controller C if the general foveal field direction is oriented at portion P-e prior to allowing the input command to be processed. If a user touches image 16B, the system verifies if the general fovea field direction is oriented at portion P-b and P-e prior to allowing the input command to be processed. If a user touches image 16C, the system verifies if the general foveal field direction is oriented at portion P-g and P-h prior to allowing the input command to be processed and so on and so forth.

Figure 3:
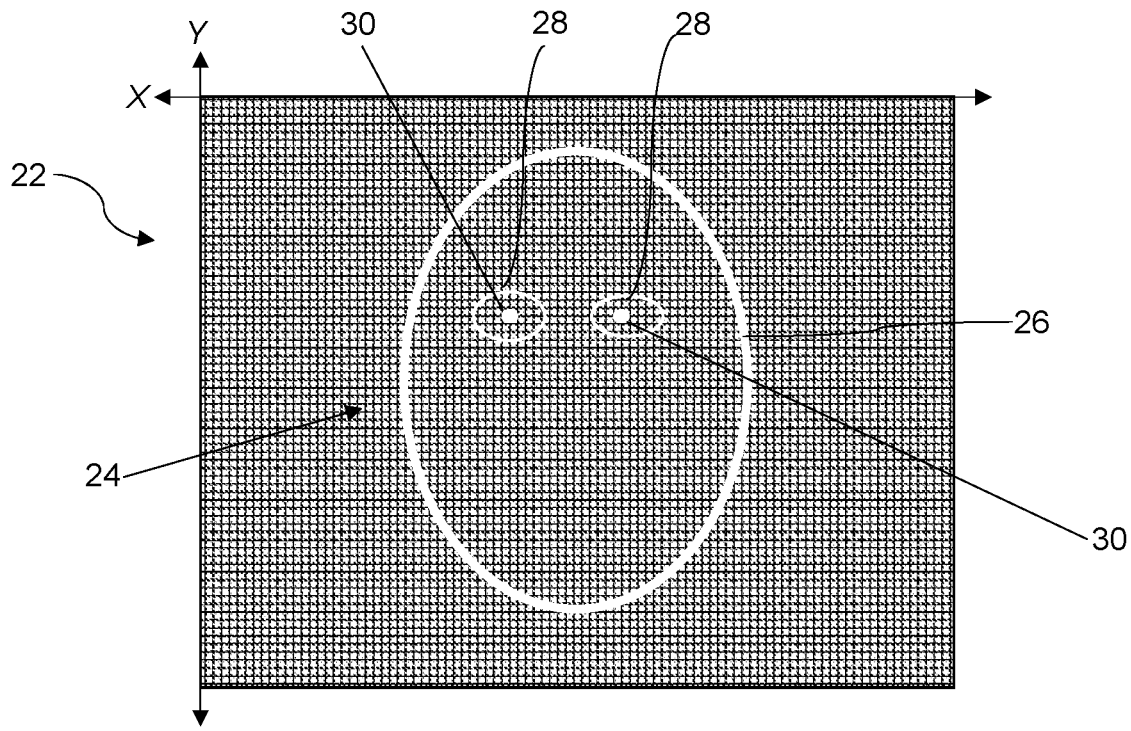
FIG. 3 is a schematic representation of a computer-generated cartesian table based on captured images of a system user's face including contour, eyes and irises in accordance with a non-restrictive illustrative embodiment of the present disclosure.

Turning now to FIG. 3, the camera 18 captures a real-time image of the user's face F and the controller C generates a cartesian table 22 and builds a grid 24 of the user's face within the table 22, in general the face contour 26 is generated, the eyes 28 and the iris 30 of each eye. Of course, the face F of the user is moving in real-time as no user is ever in a constant fixed position, moreover the position of the device comprising the display and the camera 18 may also be in constant movement especially in the case of a handheld device such a as a tablet, smartphone and the like. Accordingly, the system S by way of the computer implementable steps considers that camera 18 is in a constant fixed position and all relative movements between the camera 18 and the face F are considered to be movements of the face F in relation to the position of the camera 18. Thus, the system S is continuously repositioning—via the steps performed by the controller C in real time—the computer-generated skeletal gird 24 within the table 22. The cartesian table 22 is thus in a fixed position in tandem with the camera 18 and the grid 24 is constantly moving within this fixed table 22. The position of the grid 24 and its components 26, 28 and 30 are provided by the X and Y coordinates of the table 22 and thus the relative position of each iris 30 within an eye 28 can be detected in real time.

Figure 4:
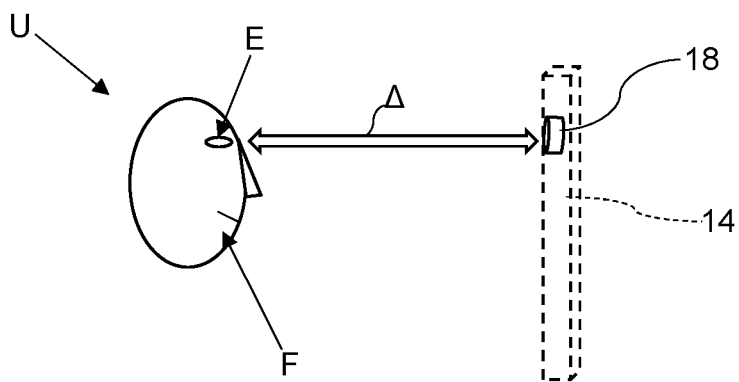
FIG. 4 is a side schematic view of a user's head viewing a computer device for displaying the GUI of the present system in accordance with a non-restrictive illustrative embodiment of the present disclosure.
Figure 5:
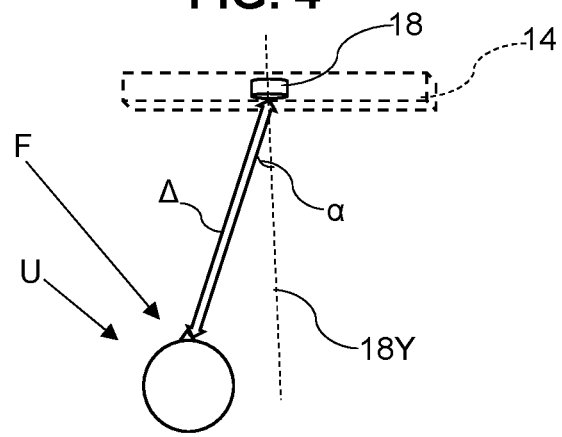
FIG. 5 is a top schematic view of a user's head viewing a computer device for displaying the GUI of the present system in accordance with a non-restrictive illustrative embodiment of the present disclosure.
Figure 6:
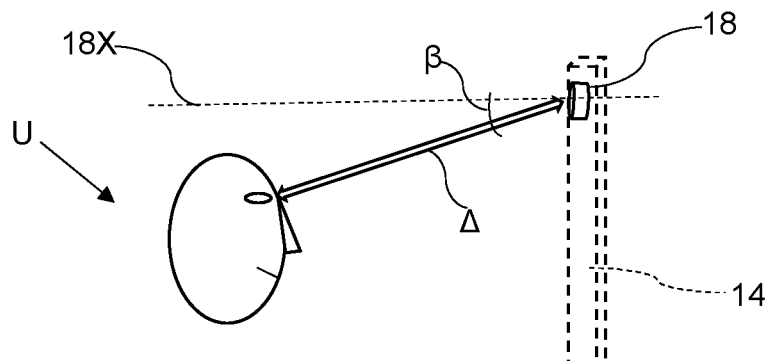
FIG. 6 is another side schematic view of a user's head viewing a computer device for displaying the GUI of the present system in accordance with a non-restrictive illustrative embodiment of the present disclosure.

Turning now to FIGS. 4, 5 and 6, the system S via the controller C executed steps determines via the real time captured images by the camera 18, the distance $\Delta$ (see FIG. 4) between the user's face F and the camera 18 positioned within a device 14 (laptop, tablet, etc.) and the relative position between the camera 18 and the user's face F as shown in FIGS. 5 and 6. Indeed, the position of the camera 18 is considered to be fixed and as such the system S defines a vertical fixed camera plane 18Y (see FIG. 5) and a horizontal camera plane 18X (see FIG. 6). The system S determines the position of the user's face F relative to the fixed planes 18Y and 18X. The system S having determined the real time distance $\Delta$ at a time stamp (e.g. Ti) determines the angle $\alpha$ between the user's Face F and the vertical plane 18Y and the angle $\beta$ between the user's face F and the horizontal plane 18X. Having determined distance $\Delta$, and angles $\alpha$ and $\beta$ at time stamp Ti, the system S is able to reposition the user's grid 24 within the cartesian table 22 at time stamp Ti. Indeed, $\Delta$, $\alpha$ and $\beta$ are in constant flux and the position of the grid 24 with the cartesian table 22 is correspondingly recalibrated. Having previously generated a skeletal grid of the user's face 24 including a contour 26, eyes 28 and irises 30, the system S via the controller steps determines the positions of the eyes 28 and irises 30 within the grid 24 in real time as it is receiving information regarding $\Delta$, $\alpha$ and $\beta$ at each time stamp. In an embodiment, $\Delta$, $\alpha$ and $\beta$ are averaged within a time gradient starting from an initial time stamp Ti to a final time stamp Tii and thus the grid 24 is recalibrated at each time gradient based on the foregoing averages.

Figure 7:
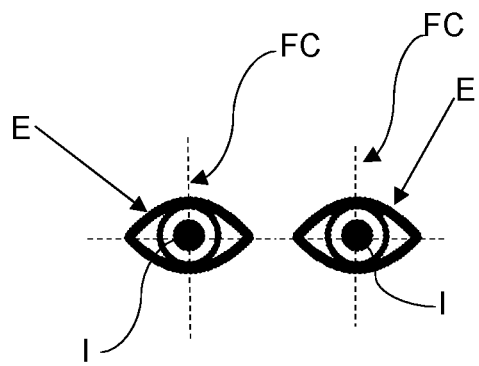
FIG. 7 is a schematic representation of an image captured by the present system of a user's eyes including irises in accordance with a non-restrictive illustrative embodiment of the present disclosure.
Figure 8:
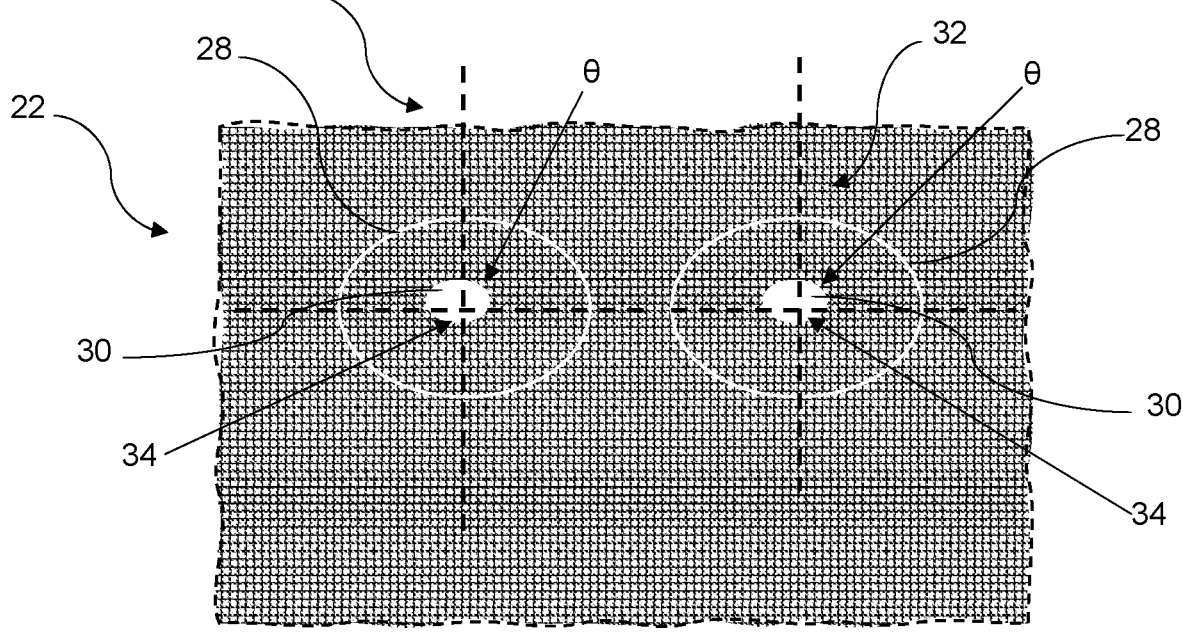
FIG. 8 is a schematic representation of a computer-generated cartesian table of the captured image of FIG. 7 in accordance with a non-restrictive illustrative embodiment of the present disclosure.

Turning to FIGS. 7 and 8, the system S provides for the camera 18 to capture images of the eyes E with a focus FC on iris I. The focus FC is translated into the cartesian table 22 which provides a computer-generated version focus 32 on the iris 30 thereby determining the X, Y coordinates of the iris 30 relative to the eye 28, this provides for determining the orientation $\theta$ of the iris 30 relative to a focal point 34. The orientation $\theta$ provides to determine if the iris 30 is directed centrally-forward, upwardly, downwardly, leftward, rightward and/or combinations thereof such as: centrally-upward, centrally-downward, centrally-leftward, centrally rightward, upwardly-leftward, upwardly-rightward, downwardly-leftward, downwardly-upward.

Therefore, the system S builds a grid 24 within a cartesian table 22 to determine the relative position of the contour 26, the eyes 28 and the irises 30. The system adjusts the position of the grid 24 within the table 22 in real time based on $\Delta$, $\alpha$ and $\beta$. The system captures the focus FC of the irises and translates this into a computer generated version 32 within the grid 24 to determine the position of each iris 30 within each eye 28 of grid 24 relative to a focal point 34 and as such determine the orientation $\theta$ of the iris relative to this focal point 34.

Figure 9:
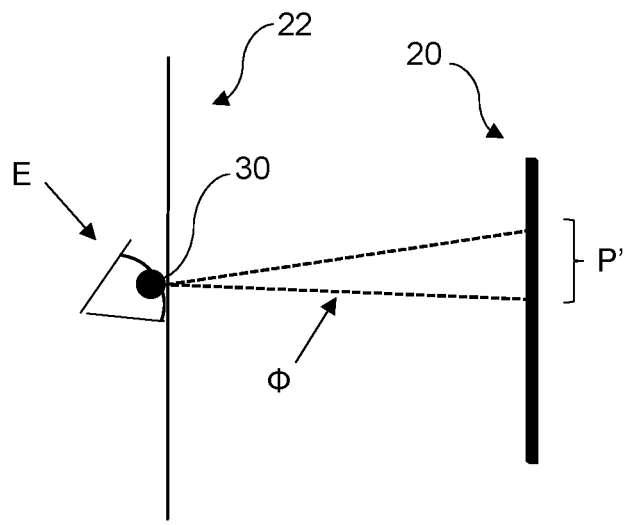
FIG. 9 is a schematic representation of a computer-generated correlation between the computer generated cartesian table of a user's eyes and irises and computer-generated cartesian table of the GUI providing a geometric correlation between eye viewing direction and a portion or portions of the GUI in accordance with a non-restrictive illustrative embodiment of the present disclosure.
Figure 10:
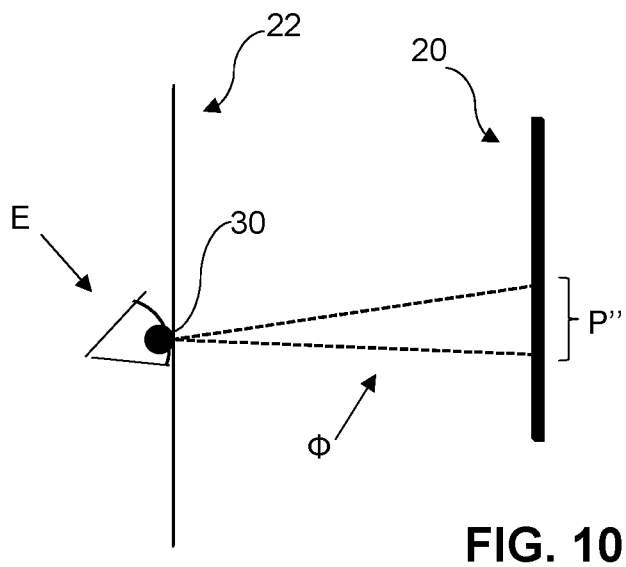
FIG. 10 is another schematic representation of a computer-generated correlation between the computer generated cartesian table of a user's eyes and irises and computer-generated cartesian table of the GUI providing a geometric correlation between eye viewing direction and a portion or portions of the GUI in accordance with a non-restrictive illustrative embodiment of the present disclosure.
Figure 11:
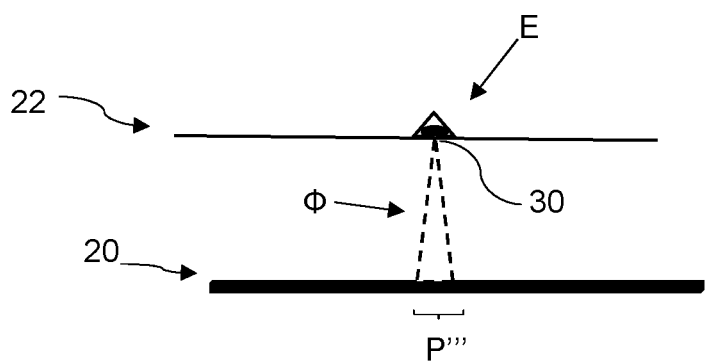
FIG. 11 is a further schematic representation of a computer-generated correlation between the computer generated cartesian table of a user's eyes and irises and computer-generated cartesian table of the GUI providing a geometric correlation between eye viewing direction and a portion or portions of the GUI in accordance with a non-restrictive illustrative embodiment of the present disclosure.

Turning to FIGS. 9, 10 and 11, the system S provides for generating a geometric correlation between cartesian table 22 (containing the grid 24 with the determined iris orientation $\theta$ as provided above) and cartesian table 20 containing the predetermined display (or interface) portions P', P'', and P'''. The screen 12' and the camera 18 are physically connected and as such the screen 12' along with the camera 18 are considered to be a in a constant fixed position and as such the grid 24 within cartesian table 22 is adjusted as mentioned before while the interface portions P', P'', and P''' determined in table 20 remain in a fixed position.

The system S identifies a distance $\Delta$ between the face F and the position ($\alpha$ and $\beta$) of the face F relative to the camera 18 as well as the orientation $\theta$ of the irises I and with this information can determine a computer-generated general fovea field direction $\phi$ in order to determine a computer generated correspondence between a computer determined general fovea field direction $\phi$ and the interface 10', thereby determining which portions P', P'', P''' of the interface 10' are in the computer generated general fovea field direction $\phi$. Indeed, FIGS. 9, 10 and 11 show a computer-generated geometric correlation between the table 22 and table 20. FIGS. 9, 10 and 11 show a representation of the human eye E based on the computer-generated positions of the eye and iris (28 and 30 respectively) within table 22. FIGS. 9, 10 and 11 show a representation of the computer-generated general fovea field direction $\phi$ and its geometric correlation to a portion (P', P'', P''') of the interface of the computer-generated cartesian table 20 based on the computer-determined distance $\Delta$, positions $\alpha$ and $\beta$ and iris orientation $\theta$.

Thus, when a user U touches a touch-display input image on a screen, the system S verifies if this touch-display input image is within an interface portion as defined herein falling within the computer-generated general fovea field direction $\phi$ before allowing the input command associated with the touch-display input image to be processed. If the touch-display input image being touched is not within an interface portion falling within the computer-generated general fovea field direction $\phi$, the system S will not allow the input command associated with the touch-display input image to be processed.

Indeed, the touch-commands above for the command input images can be replaced by cursor clicks as is known in the art.

Keeping in mind the above, in another embodiment, the system S and method herein provide for using voice input commands instead of touch screen commands.

Figure 12:
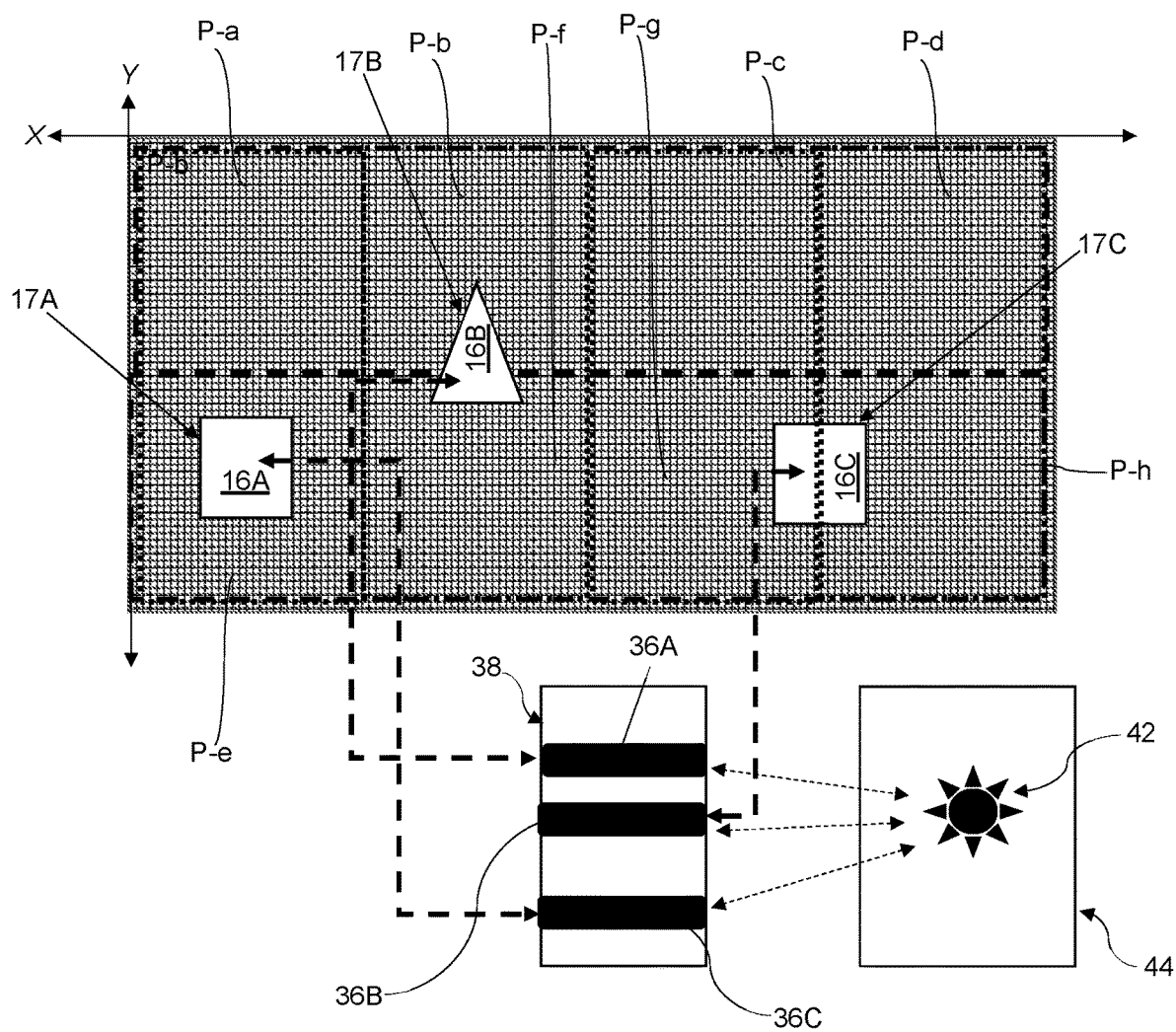
FIG. 12 is a schematic representation of the computer-generated cartesian table of FIG. 2 showing an association between the command input images and registered voice commands and a user voice command captured by the system in accordance with a non-restrictive illustrative embodiment of the present disclosure.

FIG. 12 shows the table 20 of a display screen 12' for displaying a user interface 10'. Input images 16A, 16B, and 16C are positioned within specific pixel zone 17A, 17B and 17C covering a plurality of pixels P, each with a respective coordinate (detected by the system and method). As such, the position of each input image, 16A, 16B and 16C on the screen 12' is determined by the system S and method herein. Moreover, each input images 16A, 16B, and 16C is associated with a respective word or name displayed or otherwise known to the user and with a predetermined registered voice command 36A, 36B, 36C stored within a database 38. A user U instead of touching input images 16A, 16B, and 16C, will speak the name or word associated with the image 16A, 16B and 16C, into a microphone 40 (see FIG. 1) of a computer device such as device 14. This user's voice command 42 is captured and transferred to a processor 44 to be compared with the voice registration 36A, 36B, 36C in order for the system to identify a match therebetween. A match between the voice command 42 and a given one of the registered voice commands indicates that the user U is selecting the input image 16A, 16B, and 16C associated with the matched registered voice command.

The foregoing is one of the two steps the system required to allow the command input associated with the voice selected input image to be processed. In tandem, the system S will verify if the user U is looking at the image in the same way as described above for FIGS. 1 through 11. Thus, when a user U vocally selects an input image on a screen, the system verifies if this input image is within an interface portion as defined herein and in geometric correlation with the computer-generated general fovea field direction $\phi$ before allowing the input command associated with the input image to be processed. If the vocally selected input image is not within an interface portion in geometric correlation with the generated general fovea field direction $\phi$, the system will not allow the input command associated with the input image to be processed.

In another embodiment, the system requires three steps input commands by touch, voice command and eye orientation as provided herein as well as combinations thereof. Indeed, combinations using click inputs can also be contemplated.

Generally stated an in accordance with an aspect of the present disclosure there is provided a computer-implemented system for modulating a position of a command input image displayed on a graphical user interface and being movable thereon. This modulation is based on a user viewing direction relative to graphical user interface. An image capturing device provides for capturing real time images of the user's face, eyes and irises. A controller is in operative communication with the graphical user interface and with the image capturing device. The controller has a processor with an associated memory of processor executable code that when executed provides the controller with performing computer-implementable steps herein. The controller determines a first position of the movable command input image displayed on the graphical user interface. The controller receives real time captured images of the face, eyes and irises of the user from the image capturing device. The controller separates the graphical user interface into interface portions thereof. The controller determines in real time a general eye orientation of the user based on the real time captured images. The controller determines a real-time correlation between the determined general eye orientation and one or more of the interface portions thereby determining a viewing direction of the user and one or more real-time viewed interface portions. The controller moves the movable command input image from the first position to a second position on the graphical user interface. The second position is at the one or more real-time viewed interface portions.

Figure 13:
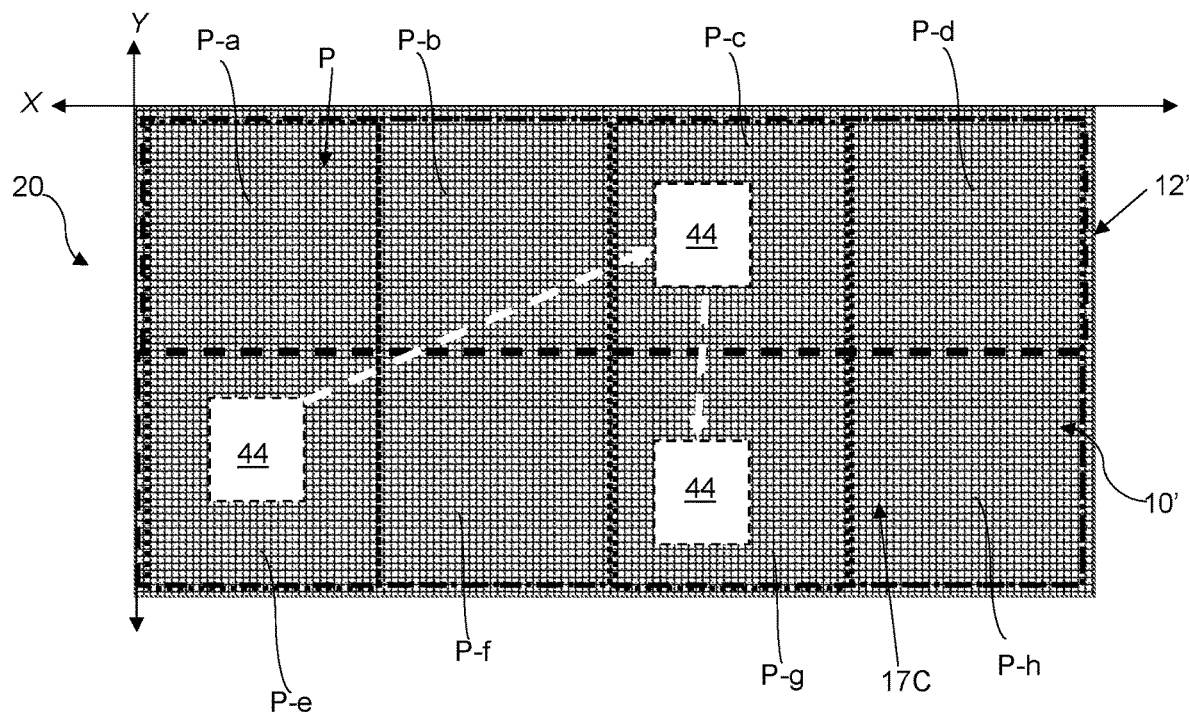
FIG. 13 is a schematic representation of a computer-generated cartesian table of a GUI of a system for modulating a position of a movable command input image displayed on the GUI along the GUI in accordance with a non-restrictive illustrative embodiment of the present disclosure.

Turning now to FIG. 13, shows the table 20 of a display screen 12' for displaying a user interface 10'. The system S provides by way of a controller C executable step to produce an input image 44. Input image 44 is movable on the interface 10' to a position that correspond to the general fovea field direction $\phi$. Therefore, the system also provides for modulating the movement of a command input image along a screen based on the user's eye orientation and specifically based on $\phi$ and the geometric correlation thereof with a display (or interface) portion. As previously explained the system S and method separates the cartesian table 20 in portions P-a, P-b, P-c, P-d, P-e, P-f, P-g, P-h, and determines if the general fovea field direction $\phi$ of the user U is directed to one or more of the foregoing portions as described hereinabove. In this case, the system S does not verify if the portions P-a, P-b, P-c, P-d, P-e, P-f, P-g, P-h being looked at contain an input image but rather only if a given portion is indeed being looked at. As previously explained, a given portion P-a contains pixels P within coordinates $(X_a, Y_a)$ to $(X_{a''}, Y_{a''})$. As such, the system and method by way of the computer implementable steps determine which display screen portions (P-a to P-h) the general fovea field direction $\phi$ is directed to and once this is determined, the system S moves input image 44 to that portion. For example, image 44 is originally positioned in portion P-e, when the general fovea field direction $\phi$ of the user U is directed to portion P-c, the input image 44 moves to that portion and likewise, when the general fovea field direction $\phi$ of the user U is re-oriented to portion P-g, the input image 44 moves again to that portion. Accordingly, the input image 44 follows the user's eyes along the screen 12'. This provides for a heightened visual experience. The input image 44 may be a cursor, a gamer console image, a multiple input image and the like. A user U can input commands via the input image 44 by way of touch commands on an input command interface (keyboard, gaming console etc.), voice commands, clicks and the like.

In an embodiment, when the general fovea field direction $\phi$ is directed to an input image, such as 44 which is initially positioned for example in portion P-e (i.e. the initial position) and the user provides an input command (click, touch, voice, or a continued stare for a predetermined time frame or any combination thereof), the system S verifies if portion P-e the portion at which $\phi$ is directed at contains the input image 44 prior to allowing the command to be completed. In this example, the input command provides for "locking" the input image 44 which once "locked" in this manner is provided to move along with the eye movement as provided hereinabove. The input image 44 may be "unlocked" or released from the foregoing eye control by an input command. (click, touch, voice, or a continued stare for a predetermined time frame or any combination thereof).

In an embodiment, the "locked" command input image 44 follows the $\phi$-interface portion correlation in real time. In an embodiment, the user uses the input image for a variety of voice or otherwise activated input commands such as in the example of a virtual game console which has various commands (forward, backward, fire, throw, catch, run, jump and so and so forth).

In an embodiment, the "locked" input image 44 becomes invisible (on command or automatically) and but continues to follow the $\phi$-interface portion correlation in real time as explained above and can selectively appear at desired positions on the screen either automatically or via user input commands.

Figure 14:
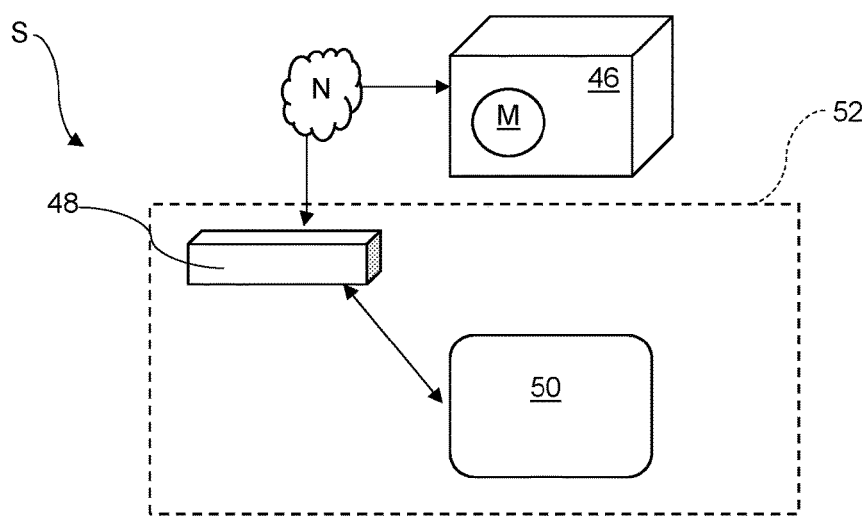
FIG. 14 is a schematic representation of an system computer architecture for modulating user input image commands based on a viewing direction of a user's eyes in accordance with a non-restrictive illustrative embodiment of the present disclosure.

Turning now to FIG. 14, there is shown a schematic representation of a computer architecture of the system S comprising a main or server controller 46 in a network communication N with a local controller 48 which is in communication with a user interface 50. The local controller 48 and the user interface 50 can be part of a single integrated device 52 (laptop, PC, mobile device, tablet etc.) or can be two physically separated components in wire or wireless communication. Controller 46 and/or controller 48 can be unitary components or comprise a plurality of separate intercommunicating control components and architectures as can be contemplated by the skilled artisan. The controller 46 comprises an associated memory M with controller (i.e. processor) executable code that when executed provides the controller with performing the computer-implementable steps herein.

In an embodiment of the system S, the memory M provides for registering a user ID such as an image of the face, or eyes, a fingerprint, a voice command and the like and the controller will only execute the computer implementable steps herein only when the user has entered their assigned ID. User recognition by the system S is convenient when input commands provided herein relate to financial transactions or to other personal data but are not limited thereto.

Generally stated and in accordance with an aspect of the present disclosure, there is provided a system for simultaneously displaying multiple graphical user interfaces via the same display. The multiple graphical user interfaces are hosted by one or more remote host controllers. A user device is in operative communication with the one or more remote host controllers and comprises an interface display for displaying one or more of the multiple graphical user interfaces. A system controller is in operative communication with the user display device. The system controller has a processor with an associated memory of processor executable code that when executed provides the controller with performing computer-implementable steps comprising separating the interface display in two or more interface display portions and selectively providing for two or more of the graphical user interfaces to be simultaneously displayed via respective ones of the two or more interface display portions.

Figure 15:
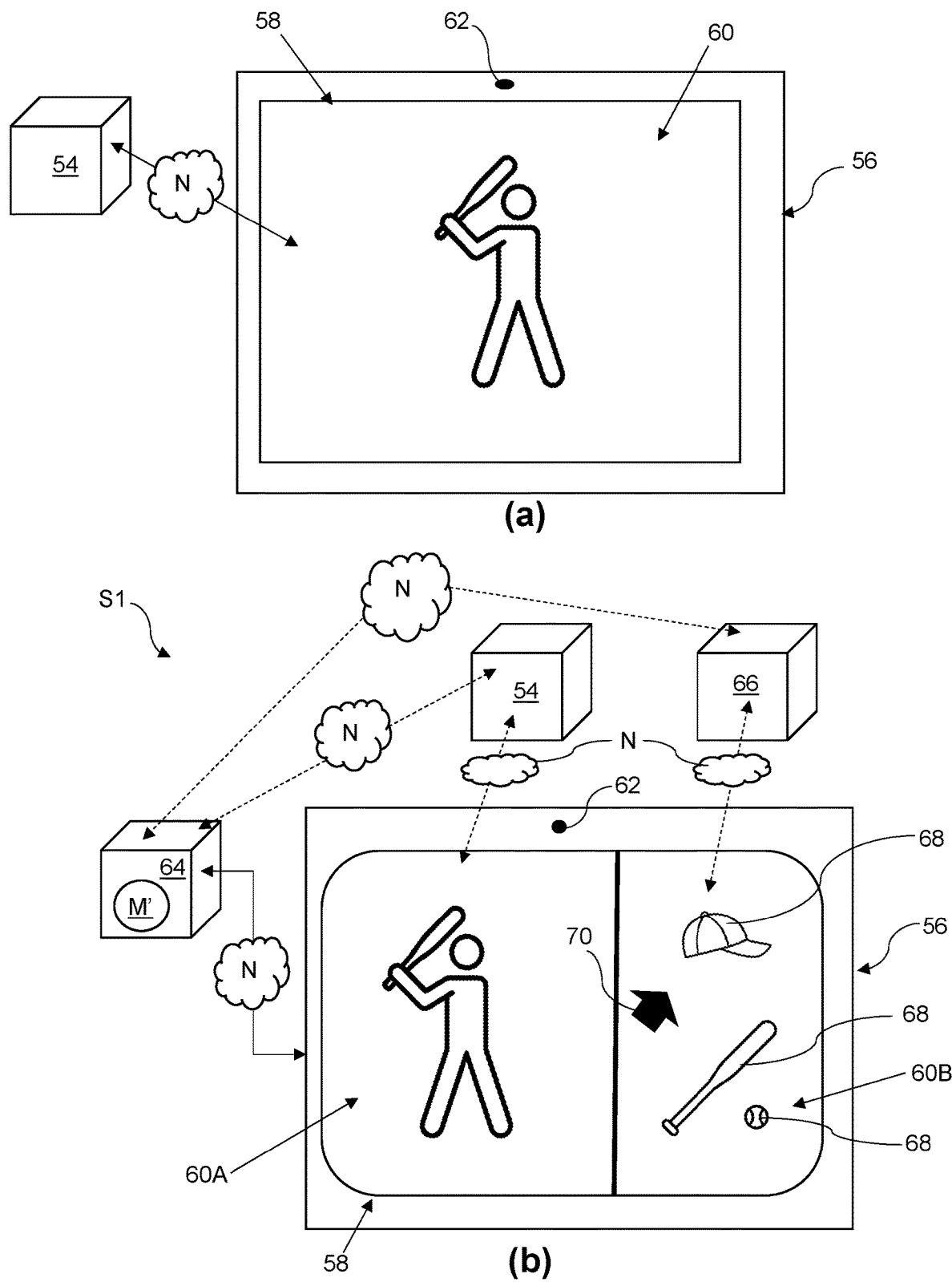
FIG. 15 shows a display running a user interface generated by a controller hosting a programme therefor in in (a) and an interface system in (b) for simultaneously displaying multiple graphical user interfaces via the same display shown running the same graphical user interface in (a) via the same display in addition to simultaneously running another graphical user interface generated by the same or another controller hosting a programme therefor in accordance with a non-restrictive illustrative embodiment of the present disclosure.

Turning now to FIG. 15, there is shown in (a) a remote server 54 hosting a program that is being run on a user device 56 via a network N communication. The user device 56 comprises an integrated device controller (not shown), a device display screen 58 for displaying a user interface 60 and an image capturing device 62. In (b), there is shown a system S1 for for simultaneously displaying multiple user interfaces via the same display. The system S1 comprises a controller 64 in a network N communication with device 56. The controller 64 has an associated memory M' of controller executable code that when executed provides for performing the computer implementable step of splitting the user interface 60 into at least two interface portions or sub-interfaces 60A and 60B. Indeed, the screen 58 continues to run or display the program of host server 54 (in interface portion 60A) but in tandem it also runs a program from another host server 66 (in interface portion 60B). Of course, the programs producing the visual displays in interface portions 60A or 60B may be from the same host server. In an example, interface portion 60A shows a sporting event while interface portion 60B juxtaposed to sub-interface 60A provides for advertising articles 68. Indeed articles 68 may be input images as described herein and can be operated by touch commands, cursor clicks, eye orientations (e.g., φ) as described herein, voice commands and combinations thereof.

In an embodiment, the controller 64 provides for the user device 56 to access both programs from both hosts 54 and 66 (or a single host or multiple host as can be contemplated by the skilled artisan) or the controller 64 communicates via a network N with these hosts 54 and 66 to receive their program data and to recommunicate this data to the device 56 in a single visual display on the same screen 58 split in portions to run both programs simultaneously.

Thus, the controller 64 (i.e. a server) of the system S1 provides by computer implementable steps to run two different programs on the user device 56 (handheld tablet) via the controller thereof, in order to display two different and unrelated interfaces or sub-interfaces or interface portions 60A and 60B. The controller 64 can return to one of the two or more juxtaposed interfaces and hence run one program. Thus, the controller 64 provides for advertising in tandem or providing options to the user for advertisements or provide options to the user to watch another simultaneous event or view highlights of that simultaneous event and so one and so forth.

In an embodiment, the system S1 provides for the user to choose to run more than one program on their display device screen 58. Thus, the controller 64 separates the interface 60 is portions 60A and 60B based on an X,Y cartesian table of pixels, where a portion of the pixels will display one program and another portion of the pixels will display another program. Of course, the interface 60 may be separated in still further portions if convenient. The size of the portions may be modulated by the controller 64, the user, the program hosts and combinations thereof. Thus, any convenient ratio can be used for screen splitting. Moreover, the screen can be split vertically as shown in FIG. 15 or horizontally. The foregoing may be modulated by the controller 64, the user, the program hosts and combinations thereof.

As such, in one example, a user can enjoy a sporting event or other online streaming product and can simultaneously view advertising without interruption of their main entertainment as two interfaces are being simultaneously run by the system S1. The user can also purchase products in tandem via the input images 68. Indeed, the double interface shown in FIG. 15 may also include a command input image 70 such as a cursor 70 that moves with the filed of view orientation φ as described herein to move across both sub-interfaces 64A and 64B so that the user can input commands via the cursor by clicking, voice commands and the like. The input image 70 may include other command input applications and not be a cursor but an icon or window for receiving one more input commands.

In an embodiment, the systems herein provide for users to open an application in order to access the systems and methods herein, as such, in one example, the user opens the system application which identifies the user via visual recognition (face, eyes, iris), or touch recognition, or fingerprint recognition, or via voice command or a security password or any combination thereof. As such, the application provides for accessing one or more of the operating systems herein, such as the ability to modulate and/or operate input images via eye orientation φ, the ability for the system to split the user interface and display two or more programs in tandem, the ability for the user to move an input image (such as a cursor, or a game console image) along one interface or a plurality of juxtaposed interfaces or interface portions or sub-interfaces via the same display screen including selectively rendering the command input image visible or invisible by user input commands or by predetermined computer-implementable steps.

The various features described herein can be combined in a variety of ways within the context of the present disclosure so as to provide still other embodiments. As such, the embodiments are not mutually exclusive. Moreover, the embodiments discussed herein need not include all of the features and elements illustrated and/or described and thus partial combinations of features can also be contemplated. Furthermore, embodiments with less features than those described can also be contemplated. It is to be understood that the present disclosure is not limited in its application to the details of construction and parts illustrated in the accompanying drawings and described hereinabove. The disclosure is capable of other embodiments and of being practiced in various ways. It is also to be understood that the phraseology or terminology used herein is for the purpose of description and not limitation. Hence, although the present disclosure has been provided hereinabove by way of non-restrictive illustrative embodiments thereof, it can be modified, without departing from the scope, spirit and nature thereof and of the appended claims.

What is claimed is:

1. A computer-implemented system for modulating user commands via command input images displayed on a graphical user interface based on a user viewing direction relative to the displayed command input images and the graphical user interface, the system comprising:
   an image capturing device for capturing real time images of the user's face, eyes and irises;
   a controller in operative communication with the graphical user interface and with the image capturing device, the controller having a processor with an associated memory of processor executable code that when executed provides the controller with performing computer-implementable steps comprising:
      determining a respective position for each of the command input images displayed on the graphical user interface;
      receiving real time captured images of the face, eyes and irises of the user from the image capturing device;
      separating the graphical user interface into interface portions thereof;
      determining in real time a general eye orientation of the user based on the real time captured images;
      determining a real-time correlation between the determined general eye orientation and one or more of the interface portions thereby determining a viewing direction of the user and one or more real-time viewed interface portions; and
      determining in real-time if the one or more viewed interface portions contain one or more of the command input images;
   wherein when the user inputs a user command via a selected one of the command input images, the execution of the processor executable code provides the controller with performing computer-implementable steps comprising:
      determining in real time if the selected command input image is positioned within the one or more viewed interface portions or if the selected command input image is not positioned within the one or more viewed interface portions;
      allowing the user command to be processed if the selected command input image is positioned within the one or more viewed interface portions; and
      preventing the user command to be processed if the selected command input image is not positioned within the one or more viewed interface portions.

2. A system according to claim 1, wherein the user inputs the user command via the selected one of the command input images by a touch command.

3. A system according to claim 1, wherein the user inputs the user command via the selected one of the command input images by a click command.

4. A system according to claim 1, wherein the system further comprises a voice input device in operative communication with the controller, wherein user inputs the user command via the selected one of the command input images by a voice command via the voice input device.

5. A system according to claim 4, wherein the memory contains a database of registered voice commands, each of the registered voice commands being associated with a respective one of the command input images, wherein execution of the processor executable code provides the controller with performing computer-implementable steps comprising:
   receiving the voice command via the voice input device;
   comparing the voice command with the registered voice commands;
   determining a match between the voice command and the registered voice command, wherein the match is indicative of the selected one of the command input images.

6. A method for modulating user commands via command input images displayed on a graphical user interface based on a user viewing direction relative to the displayed command input images and the graphical user interface, the method comprising:
   capturing real time images of the user's face, eyes and irises;
   determining a respective position for each of the command input images displayed on the graphical user interface;
   separating the graphical user interface into interface portions thereof;
   determining in real time a general eye orientation of the user based on the real time captured images;
   determining a real-time correlation between the determined general eye orientation and one or more of the interface portions thereby determining a viewing direction of the user and one or more real-time viewed interface portions;
   determining in real-time if the one or more viewed interface portions contain one or more of the input images;
   providing for the user to input a user command via a selected one of the command input images;
   determining in real time if the selected command input image is positioned within the one or more viewed interface portions or if the selected command input image is not positioned within the one or more viewed interface portions;
   allowing the user command to be processed if the selected command input image is positioned within the one or more viewed interface portions; and
   preventing the user command to be processed if the selected command input image is not positioned within the one or more viewed interface portions.

7. A method according to claim 6, further comprising providing the user to input the user command via the selected one of the command input images by a touch command.

8. A method according to claim 6, further comprising providing the user to input the user command via the selected one of the command input images by a click command.

9. A method according to claim 6, further comprising providing the user to input the user command via the selected one of the command input images by a voice command via.

10. A method according to claim 9, further comprising:
capturing the voice command;
comparing the voice command with registered voice commands stored within a database;
determining a match between the voice command and the registered voice command, wherein the match is indicative of the selected one of the command input images.

11. A computer-implemented system for modulating a position of a command input image displayed on a graphical user interface and movable thereon based on a user viewing direction relative to graphical user interface, the system comprising:
an image capturing device for capturing real time images of the user's face, eyes and irises;
a controller in operative communication with the graphical user interface and with the image capturing device, the controller having a processor with an associated memory of processor executable code that when executed provides the controller with performing computer-implementable steps comprising:
determining a first position of the movable command input image displayed on the graphical user interface;
receiving real time captured images of the face, eyes and irises of the user from the image capturing device;
separating the graphical user interface into interface portions thereof;
determining in real time a general eye orientation of the user based on the real time captured images;
determining a real-time correlation between the determined general eye orientation and one or more of the interface portions thereby determining a viewing direction of the user and one or more real-time viewed interface portions; and
moving the movable command input image from the first position to a second position on the graphical user interface, wherein the second position is at the one or more real-time viewed interface portions.

12. A system according to claim 11, wherein the movable command input image provides for inputting one or more user commands.

13. A system according to claim 11, wherein the movable command input image is selectively rendered non-visible on the graphical user interface although present by a user input command.

14. A system according to claim 11, wherein the movable command input image is selectively activated by a user input command to be movable and selectively deactivated by a user input command to immovable.

15. A system according to claim 14, wherein the user input command for activating the movable command input image is selected from the group consisting of a touch screen command, a voice command, a click command, a console command, a keyboard command, and any combination thereof.

16. A system according to claim 14, wherein the user input command for deactivating the movable command input image is selected from the group consisting of a touch screen command, a voice command, a click command, a console command, a keyboard command, and any combination thereof.

17. A system according to claim 14, wherein the user input command for activating the movable command input image comprises a user viewing direction command, wherein the execution of the processor executable code provides the controller with performing computer-implementable steps comprising:
determining the interface portion in which the command input image is at the initial position thereby determining an initial interface portion;
determining in real time a general eye orientation of the user based on the real time captured images;
determining a real-time correlation between the determined general eye orientation and the initial interface portion thereby determining if the viewing direction of the user is directed to the initial interface portion; and
activating the input command image based on a predetermined time frame stored in the memory during which the the user viewing direction is directed to the initial interface portion.

* * * * *